July 4, 1950
W. H. PETTIT
2,513,965
COIL RETAINING MEANS
Filed Aug. 20, 1946
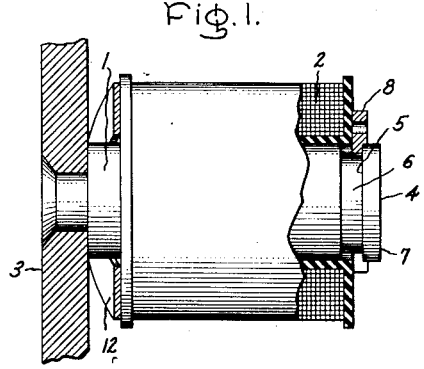
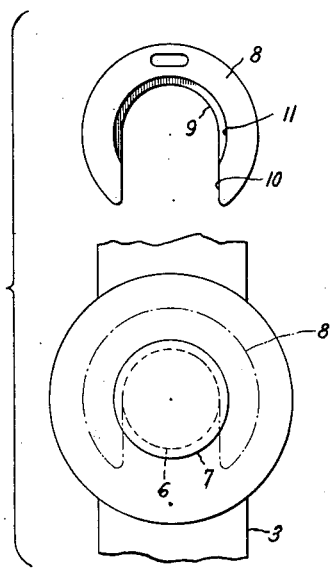
Inventor:
Ward H. Pettit,
by Claude H. Mott
His Attorney.

Patented July 4, 1950

2,513,965

UNITED STATES PATENT OFFICE 2,513,965

COIL RETAINING MEANS

Ward H. Pettit, Schenectady, N. Y., assignor to General Electric Company, a corporation of New York Application August 20, 1946, Serial No. 691,813

2 Claims. (Cl. 175—21)

My invention relates to retaining means, more particularly to retaining means for securing the coil of an electromagnet on a core member, and has for its object simple and reliable shockproof retaining means.

More specifically, my invention relates to means for retaining the magnet coil in place on the core member during severe shocks applied to the magnet.

In carrying out my invention in one form, I provide an annular groove around the core member adjacent one end, and a retaining washer which is open at one edge, so that it can be moved edgewise in place around the shank formed by the groove, and also countersunk on one side to receive the head of the core member. I also provide a spring for forcing the coil against the washer thereby to secure the retaining washer with the head of the core member in the countersunk opening of the washer.

For a more complete understanding of my invention reference should be had to the accompanying drawing Fig. 1 of which is a fragmentary side elevation view, partly in section, of an electromagnet embodying my invention, while Fig. 2 is a side elevation view of Fig. 1 but showing the coil retaining washer in position to be inserted in place.

Referring to the drawing, I have shown my invention in one form as applied to an electromagnet comprising a cylindrical core member 1 on which is mounted a magnet coil 2. The core member 1 is secured at its lefthand end, as seen in the drawing, to a core member 3, only a portion of which is shown, and which, it will be understood, is suitably shaped to form a pole for the magnet, the other pole of which is the righthand end 4 of the core 1. Also it will be understood that a suitable armature, not shown, cooperates with the poles of the magnet.

For the purpose of securing the coil in place on the core member 1, I provide an annular groove 5 in the core member adjacent its righthand end thereby to form a shank portion 6 and an outer head or flange portion 7, together with a coil retaining annular washer member 8 having an internal wall 9 having a diameter slightly greater than the diameter of the shank portion 6 and provided with an edge opening 10 whose width is substantially the same as the diameter of the wall 9. The thickness of the washer 8 in a direction lengthwise of the core 1 as seen in Fig. 1 is somewhat less than the width of the slot 5 so that the washer can be slipped easily in place in the slot surrounding the shank 6.

Also the washer 8 is countersunk on one side to receive the head 7 of the core member, the countersunk opening having a diameter slightly greater than the diameter of the head 7. By reason of this annular countersunk opening a circular flange or shoulder 11 is formed on the washer in spaced relation with the inner wall 9 which flange surrounds the head 7, the flange extending over an arc substantially greater than 180 degrees so as to secure the washer against lateral sliding movement with respect to the head. As shown in Fig. 2, the flange extends over an arc of substantially 240 degrees.

A flat single coil spring 12 is provided between the lefthand end of the coil and the base 3 for biasing the coil toward the righthand against the retaining washer 8 whereby the retaining washer is held against the core head 7 with the head in the countersunk opening and the retaining flange 11 surrounding the head.

In the assembly of the coil on the magnet core, the spring 12 is first slipped over the core 1, then the coil is put in place as shown in Fig. 1 and pressed momentarily toward the lefthand whereby the spring is compressed and the righthand end of the coil is moved to a position substantially flush with the lefthand wall of the slot 5. With the coil held in this position, the retaining washer 8 is moved edgewise from a position substantially as indicated in Fig. 2 directly above, or on one side, of the slot laterally into the slot and surrounding the shank 6, as shown in Fig. 1 and indicated in Fig. 2 by the dash-dot line. With the washer thus in place the coil is released and is forced by the spring 12 toward the righthand against the washer as shown in Fig. 1. Obviously the coil can be removed easily by the reverse procedure.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. In an electromagnet, a base, a cylindrical core mounted at one end upon said base and having as its other end a shank portion of reduced diameter forming a core head, a coil mounted on said core, and an annular retaining washer having an internal diameter slightly greater than the diameter of said shank portion and an edge opening equal in width to said internal diameter, said washer being seated on said shank portion adjacent said head and having at its adjacent side an annular recess subtending an arc appreciably greater than 180° into which said head fits, and resilient means between said base and said coil biasing said coil against said washer thereby to hold said washer against said head, whereby said head locks said washer against lateral displacement.

2. In an electromagnet, an elongated cylindrical core member having at one end a circular head of substantially the same diameter as said member and an annular groove of slightly smaller diameter than said head, said groove forming a cylindrical shank portion in said member adjacent said head, a second core member secured to the other end of said cylindrical core member and forming a base for said electromagnet, a coil mounted on said cylindrical core member, an annular retaining member embracing said shank portion and having an edge opening slightly larger than the diameter of said shank portion whereby said retaining member is loosely slidable laterally away from said elongated cylindrical member, said retaining member having an annular recess fitting over said head portion and subtending an arc appreciably greater than 180°, and resilient means associated with said coil for pressing said retaining member against said head portion whereby said head portion locks said retaining member against lateral displacement.

WARD H. PETTIT.

REFERENCES CITED

The following references are of record in the file of this patent:

UNITED STATES PATENTS

| Number | Name | Date |
|---|---|---|
| 480,336 | Monday | Aug. 9, 1892 |
| 1,236,357 | Reeve | Aug. 7, 1917 |
| 1,340,387 | Emmert | May 18, 1920 |
| 1,469,488 | Siewech | Oct. 2, 1923 |
| 1,871,969 | Elsey | Aug. 16, 1932 |
| 1,949,106 | Manneschniedt | Feb. 27, 1934 |
| 1,958,935 | Aichele | May 15, 1934 |
| 2,397,849 | Engeln | Apr. 2, 1946 |
| 2,440,341 | Lehman et al. | Apr. 27, 1948 |